(12) United States Patent
Fukano et al.

(10) Patent No.: US 6,832,788 B2
(45) Date of Patent: Dec. 21, 2004

(54) MANIFOLD-CONNECTING MECHANISM

(75) Inventors: Yoshihiro Fukano, Moriya (JP);
Masami Yoshida, Ryugasaki (JP);
Noriya Sasaki, Kasukabe (JP)

(73) Assignee: SMC Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/409,176

(22) Filed: Apr. 9, 2003

(65) Prior Publication Data

US 2003/0197369 A1 Oct. 23, 2003

(30) Foreign Application Priority Data

Apr. 19, 2002 (JP) ........................................ 2002-118143

(51) Int. Cl.[7] ................................................ F16L 39/00
(52) U.S. Cl. ................................ 285/124.5; 285/124.4; 285/125.1; 403/317
(58) Field of Search ........................... 285/142.1, 124.3, 285/124.4, 124.5, 23, 305, 125.1; 403/315, 316, 317, 389; 137/884, 269

(56) References Cited

U.S. PATENT DOCUMENTS

| | | | | |
|---|---|---|---|---|
| 3,457,943 A | * | 7/1969 | Kawabata | 137/269 |
| 3,516,442 A | * | 6/1970 | Munroe | 137/269 |
| 3,879,068 A | * | 4/1975 | Stampfli | 285/124.5 |
| 4,082,324 A | * | 4/1978 | Obrecht | 285/124.5 |
| 4,699,402 A | * | 10/1987 | Stoll et al. | 285/26 |
| 5,178,191 A | * | 1/1993 | Schaefer | 137/884 |
| 5,586,570 A | * | 12/1996 | Fukano et al. | 137/884 |
| 5,704,399 A | * | 1/1998 | Hayashi et al. | 137/884 |
| 6,237,634 B1 | * | 5/2001 | Narita et al. | 137/884 |

OTHER PUBLICATIONS

Copending U.S. patent application No. 10/304,763 filed Nov. 27, 2002 by Yoshihiro Fukano et al.

\* cited by examiner

Primary Examiner—Eric K. Nicholson
Assistant Examiner—Aaron Dunwoody
(74) Attorney, Agent, or Firm—Paul A. Guss

(57) ABSTRACT

Engaging holes are disposed on both sides of an upper surface of a body of a manifold and are spaced from an axis of the body by a predetermined distance. A solenoid-operated valve is installed to the manifold. Shaft sections of a U-shaped connecting pin are inserted into the engaging hole of the body and another engaging hole of an adjacent manifold respectively. A connecting plate is installed to connect engaging projections which are formed at a second end of the body and a second end of the adjacent manifold.

39 Claims, 9 Drawing Sheets

MANIFOLD-CONNECTING MECHANISM

BACKGROUND OF THE INVENTION

1. Field of the Invention

The present invention relates to a manifold-connecting mechanism which makes it possible to easily connect manifolds without using any attachment rail or the like. Elements such as solenoid-operated valves are attached to the manifold.

2. Description of the Related Art

A manifold having fluid passages and fluid ports for communicating with a plurality of ports of a solenoid-operated valve has hitherto been used. The manifold supplies/discharges the pressure fluid to/from the inside of the solenoid-operated valve via the fluid passages and the like.

In general, when a plurality of manifolds are arranged in parallel, the manifolds are attached to a rail member by supporting both sides of the linear rail member with pawls provided on recesses of the respective manifolds. When another manifold is arranged at an adjacent position of the manifold, then the other manifold is fixed to a rail member by the pawls at the adjacent position in the same manner as described above.

That is, a plurality of manifolds are arranged in parallel along the linear rail member.

In the conventional manifold-connecting mechanism, it is necessary that the length of the rail member is set depending on the number of manifolds to be connected, because the plurality of manifolds are connected by the linear rail member. Therefore, for example, when the number of manifolds is increased, it is necessary to replace the rail member with another rail member having an entire length corresponding to the increase of the manifold or manifolds.

SUMMARY OF THE INVENTION

A general object of the present invention is to provide a manifold-connecting mechanism which makes it possible to connect a plurality of manifolds easily without using any attachment rail member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
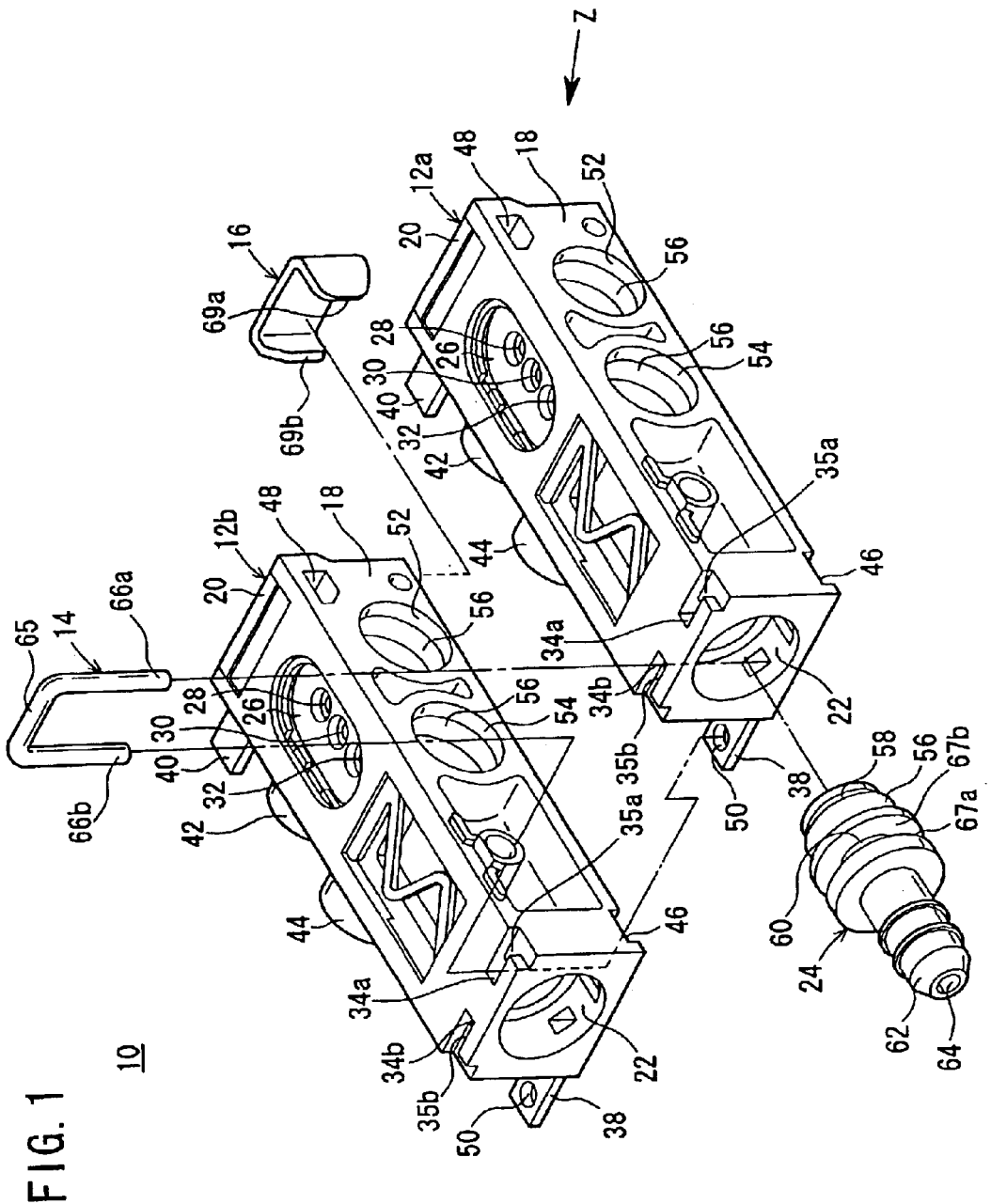
FIG. 1 is an exploded perspective view illustrating a manifold-connecting mechanism according to an embodiment of the present invention.

With reference to FIG. 1, reference numeral 10 indicates a manifold-connecting mechanism according to an embodiment of the present invention.

The manifold-connecting mechanism 10 comprises a pair of manifolds 12a, 12b, and connecting pins 14 and connecting plates 16 for connecting the manifolds 12a, 12b.

The manifolds 12a, 12b are composed of identical constituent elements respectively. Therefore, the first manifold 12a will be explained below. The constituent elements that are identical to those of the second manifolds 12b will be designated by the same reference numeral, and the explanation thereof will be omitted.

Figure 2:
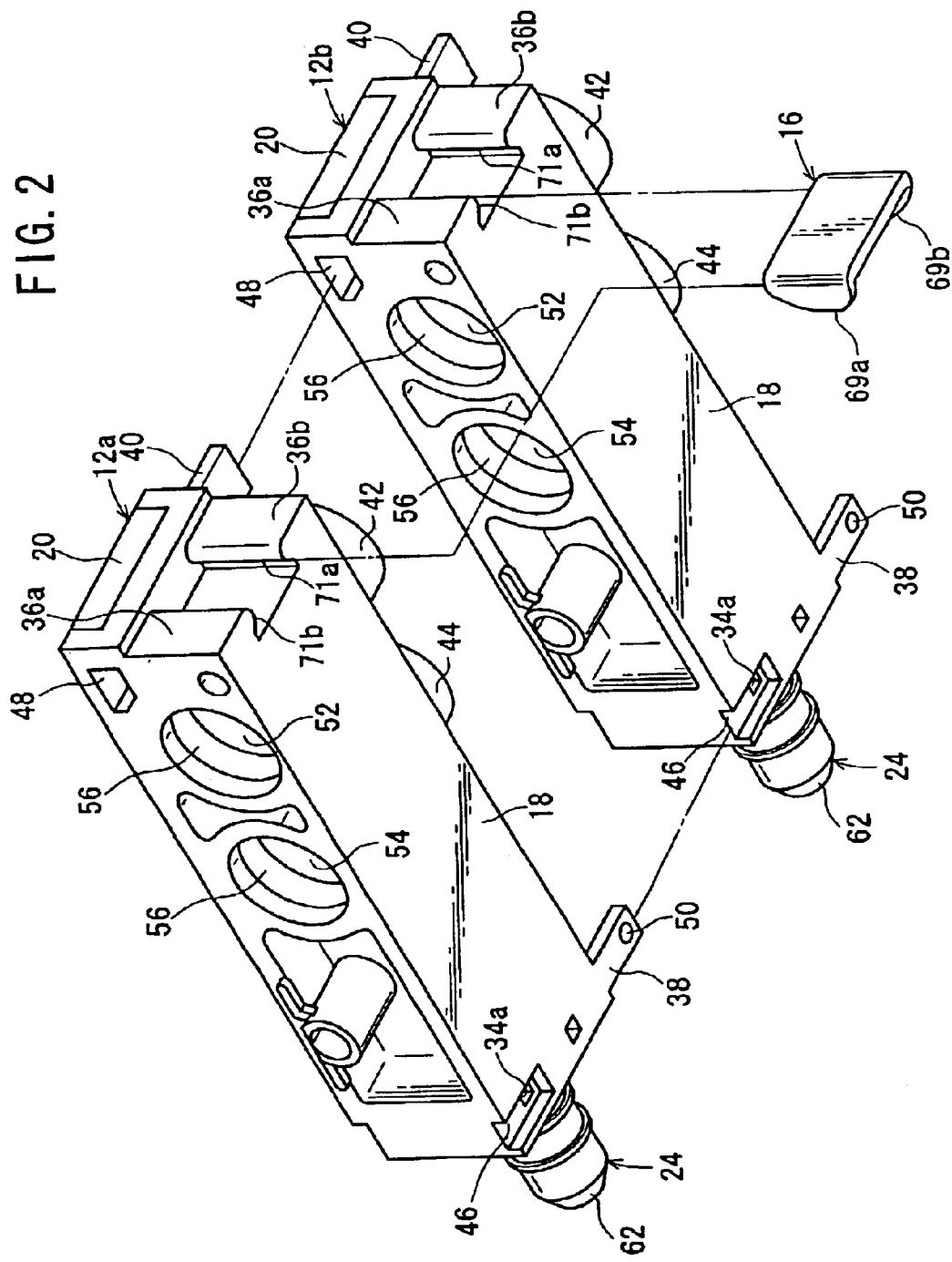
FIG. 2 is an exploded perspective view as viewed in a direction of the arrow Z shown in FIG. 1.
Figure 3:
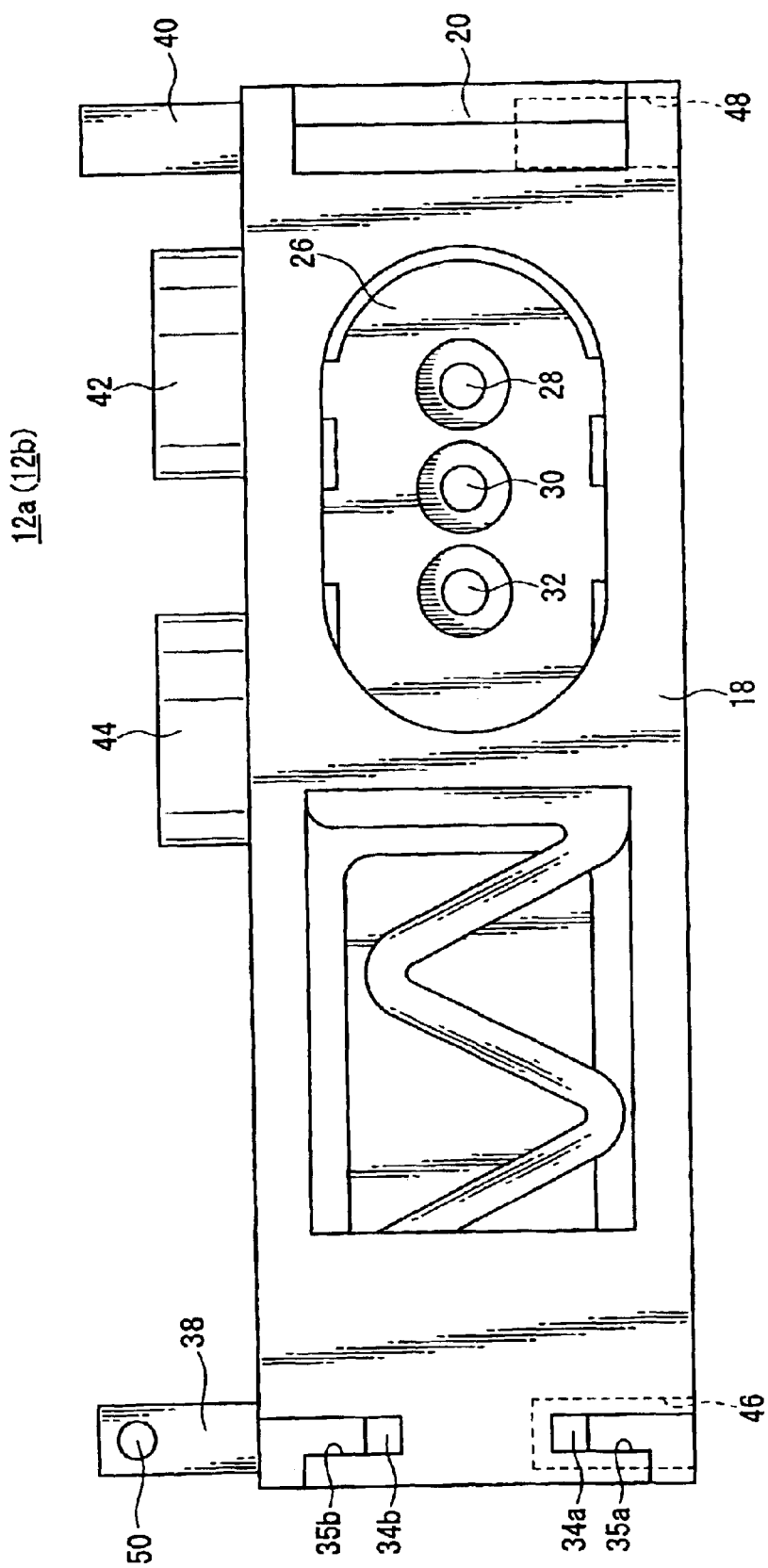
FIG. 3 is a plan view illustrating a single manifold shown in FIG. 1.

As shown in FIGS. 1 to 3, the manifold 12a comprises a body 18 of a resin material having an upper surface to which a plurality of ports of a solenoid-operated valve 17 (see FIG. 6) are connected, a stopper member 20 which is installed to an upper portion of the body 18, and a joint member 24 which is connected to a connecting port 22 disposed on a first end surface of the body 18. The material of the body 18 is not limited to the resin material. The body 18 may be formed of a metal material.

An installation cavity 26 is formed on the upper surface of the body 18, which is recessed by a predetermined depth. A part of the solenoid-operated valve 17 having a plurality of ports is inserted into the installation cavity 26. In the installation cavity 26, there are a first port 28, a second port 30, and a third port 32. The first port 28 supplies the pressure fluid to the inside of the solenoid-operated valve 17. The second port 30 discharges the pressure fluid from the inside of the solenoid-operated valve 17. The third port 32 releases the pressure fluid from the inside of the solenoid-operated valve 17 to the atmospheric air.

Figure 8:
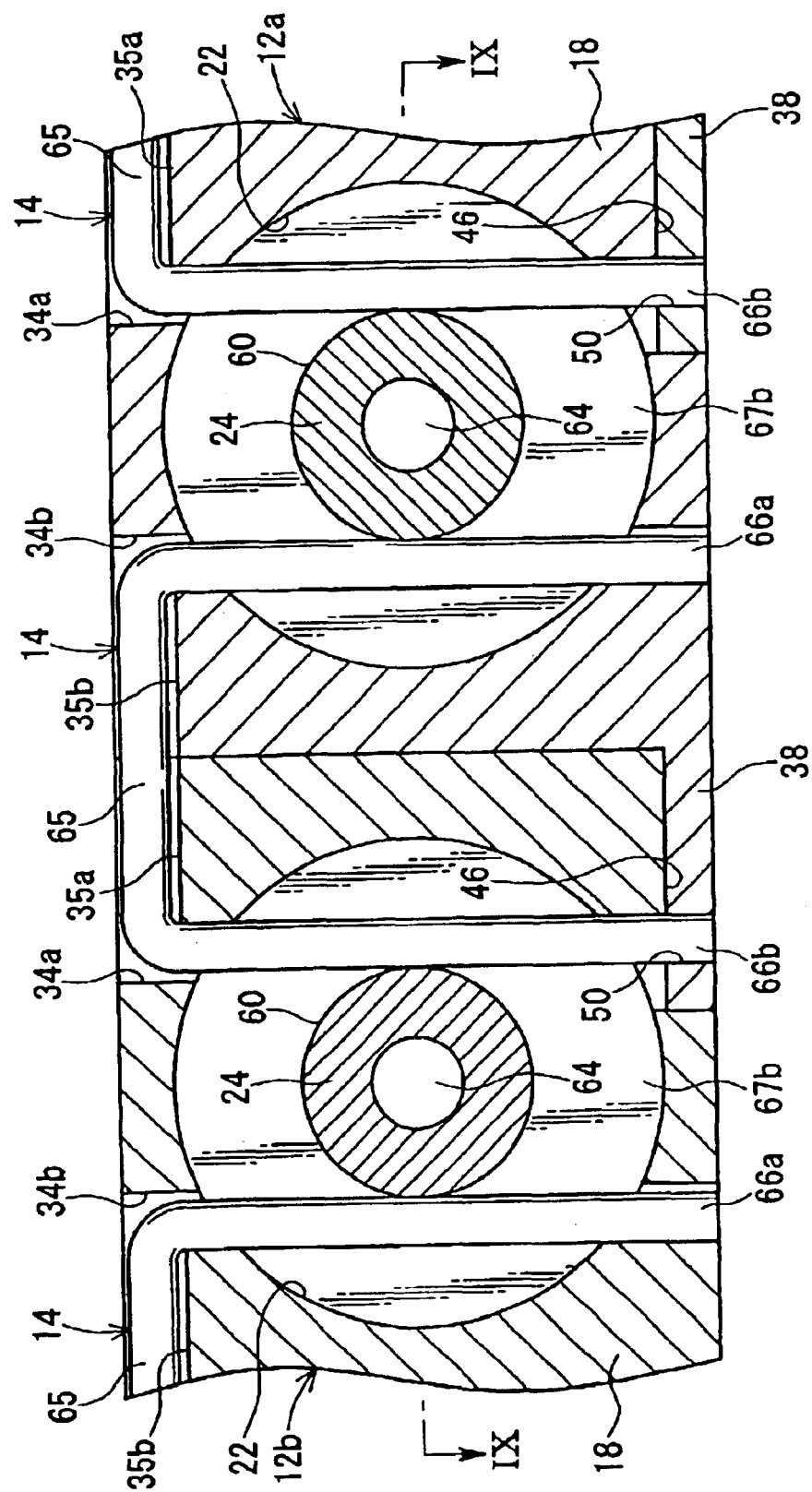
FIG. 8 is, with partial omission, a magnified vertical sectional view taken along a line VIII—VIII shown in FIG. 6.

A pair of engaging holes 34a, 34b are formed on the upper surface of the body 18 near the connecting port 22 while the pair of engaging holes 34a, 34b are spaced by a predetermined distance toward both sides from the axis of the body 18. As shown in FIG. 8, the engaging holes 34a, 34b penetrate in a substantially vertical direction so that the engaging holes 34a, 34b communicate with the connecting port 22. The engaging holes 34a, 34b are disposed slightly inwardly from the outer circumferential diameter of the connecting port 22 of the body 18. Grooves 35a, 35b are formed on the upper surface of the body 18 on which the engaging holes 34a, 34b are formed. The grooves 35a, 35b are recessed from the engaging holes 34a, 34b and extend substantially perpendicularly to the axis of the body 18 while spacing from the axis of the body 18. The engaging hole 34a communicates with a first positioning hole 46 which is formed in the side surface of the body 18 as described later on (see FIG. 8).

As shown in FIG. 2, a pair of engaging projections 36a, 36b are formed on the second end surface opposite to the first end surface of the body 18 on which the connecting port 22 is formed. The engaging projections 36a, 36b are formed while they are spaced from each other by a predetermined distance on both sides of the body 18. The engaging projections 36a, 36b protrude in the axial direction. The engaging projections 36a, 36b are formed so that they have substantially symmetrical shapes with respect to the axis of the body 18.

The engaging projection 36b together with the engaging projection 36a of the adjacent manifold 12b has substantially the same shape as the shape of the inner wall surface of the connecting plate 16 (see FIG. 2).

As shown in FIGS. 1 to 3, a first projection 38 is formed on the first side surface which extends along the axis of the body 18. The first projection 38 protrudes in a direction substantially perpendicular to the axis. The first projection 38 protrudes by a predetermined length from a lower portion of the first side surface of the body 18 near the connecting port 22.

Similarly, a second projection 40 is formed on the first side surface of the body 18 near the second end. The second projection 40 protrudes in the same direction as that of the first projection 38. The second projection 40 is formed at an upper portion of the body 18.

As shown in FIG. 1, a first connecting section 42 and a second connecting section 44, which are cylindrical, protrude from the first side surface of the body 18. The first connecting section 42 is spaced from the second connecting section 44 by a predetermined distance. The first connecting section 42 and the second connecting section 44 are provided at positions facing a first opening 52 and a second opening 54 formed on the opposite side surface of the body 18. The first connecting section 42 and the second connecting section 44 communicate with the first port 28 and the third port 32 via unillustrated passages formed in the body 18, respectively.

A first positioning hole 46 and a second positioning hole 48 are formed at positions facing the first projection 38 and the second projection 40 respectively on the opposite side surface of the body 18. The first positioning hole 46 and the second positioning hole 48 are slightly larger than the outer shapes of the first projection 38 and the second projection 40 respectively.

The first projection 38 has a through-hole 50 at a position where the through-hole 50 substantially straightly communicates with the engaging hole 34a of the body 18 when the first projection 38 is inserted into the first positioning hole 46 of the adjacent manifold 12b (see FIG. 8).

The first opening 52 and the second opening 54 are formed on the side surface of the body 18 on which the first positioning hole 46 and the second positioning hole 48 are formed. The first opening 52 communicates with the first port 28 and the first connecting section 42, and the second opening 54 communicates with the third port 32 and the second connecting section 44. The first opening 52 and the second opening 54 are spaced from each other by a predetermined distance.

That is, when the manifold 12a and the adjacent manifold 12b are connected in parallel, the first projection 38 and the second projection 40 are inserted into the first positioning hole 46 and the second positioning hole 48 which are positioned oppositely. Accordingly, it is possible to easily position the respective manifolds 12a, 12b in parallel.

Further, the first connecting section 42 and the second connecting section 44 of the adjacent manifold 12b are inserted into the first opening 52 and the second opening 54, respectively. Seal members 56 are installed to unillustrated annular grooves formed inside of the first opening 52 and the second opening 54 to retain air-tightness when the first connecting section 42 and the second connecting section 44 are inserted thereinto.

The stopper member 20 is inserted under the upper surface of the body 18. The stopper member 20 has the resilient force in the direction from the second end of the body 18 to the connecting port 22. The stopper member 20 has one end held near the connecting port 22 of the body 18. The stopper member 20 engages with a part of the solenoid-operated valve 17 (see FIG. 6) to be inserted into the installation cavity 26. Accordingly, the stopper member 20 connects the manifold 12a and the solenoid-operated valve 17.

Figure 9:
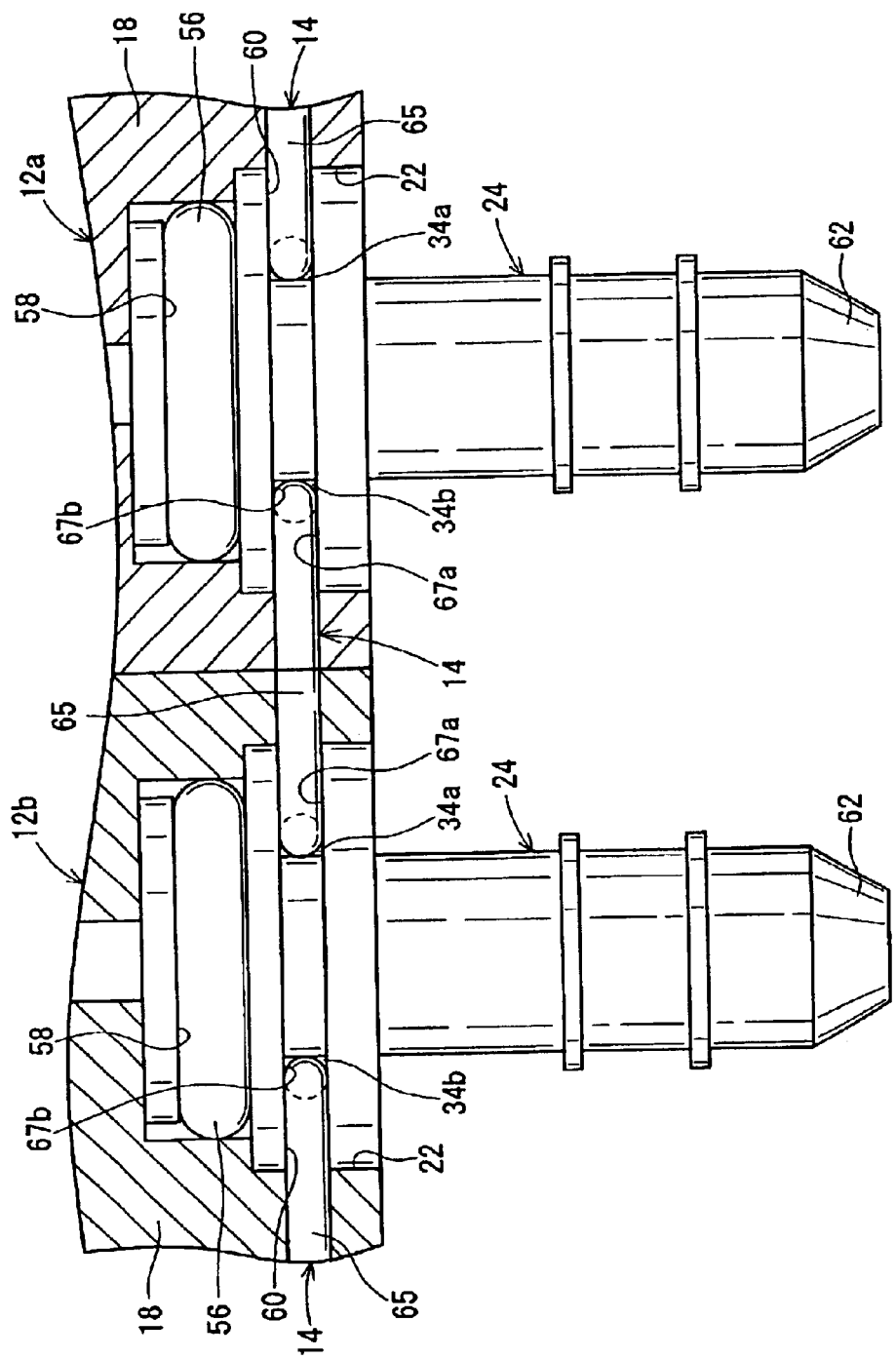
FIG. 9 is a magnified lateral sectional view taken along a line IX—IX shown in FIG. 8.

As shown in FIG. 9, an annular groove 58 is formed on the first end of the joint member 24 which is inserted into the connecting port 22 of the body 18. The seal member 56 is installed to the annular groove 58. An annular recess 60 is formed on the joint member 24 near the second end of the joint member 24.

A tube-inserting section 62, which is diametrically reduced as compared with the first end, is formed at the second end of the joint member 24. An unillustrated tube or the like is connected to the tube-inserting section 62, and the pressure fluid flows through the tube.

As shown in FIG. 1, a communication passage 64 is formed in the axial direction in the joint member 24. The pressure fluid discharged from the solenoid-operated valve 17 via the second port 30 flows through the communication passage 64 and the unillustrated passage in the body 18, and the pressure fluid is discharged to the outside via the unillustrated tube or the like.

As shown in FIG. 8, the connecting pin 14 is substantially U-shaped, and has a pair of shaft sections 66a, 66b and a connecting section 65 which connects the shaft sections 66a, 66b. The shaft sections 66a, 66b are spaced by a distance which is substantially equivalent to the distance between the engaging holes 34a, 34b when the manifold 12a and the adjacent manifold 12b are connected. Each of the shaft sections 66a, 66b of the connecting pin 14 has a length so that the shaft section 66a can be inserted into the through-hole 50 of the first projection 38 when the first shaft section 66b is inserted into the engaging hole 34a.

Figure 6:
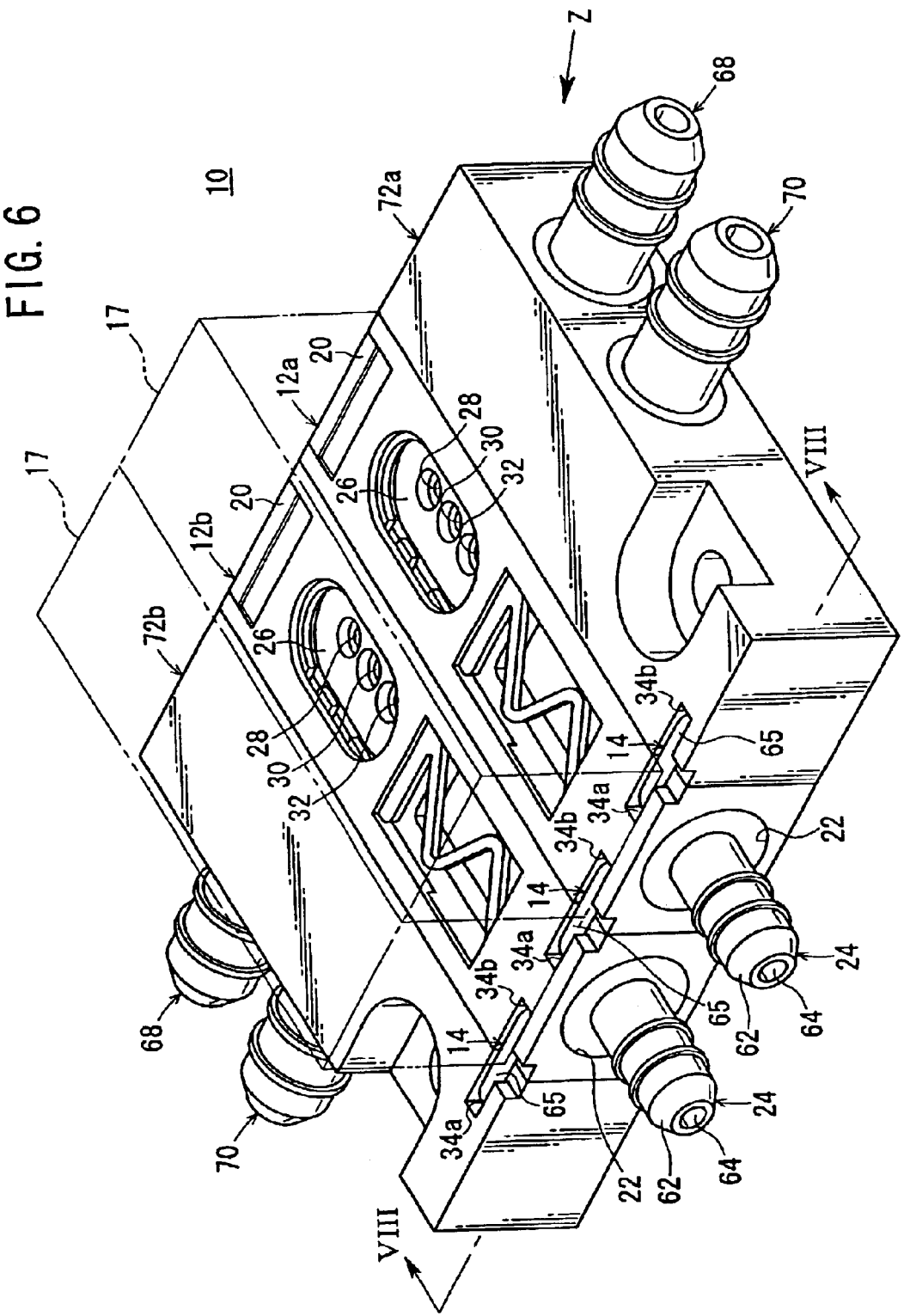
FIG. 6 is a perspective view illustrating the assembling process of each element where the manifolds and the connecting members shown in FIG. 5 are connected by connecting pins and connecting plates.

As shown in FIGS. 6 and 8, the first shaft section 66b of the connecting pin 14 is inserted into the engaging hole 34a of the manifold 12a, and the second shaft section 66a is inserted into the engaging hole 34b near the engaging hole 34a of the adjacent manifold 12b.

In this arrangement, the grooves 35a, 35b are formed on the upper surfaces of the manifolds 12a, 12b. The grooves 35a, 35b are recessed by a predetermined depth to linearly connect the engaging holes 34a, 34b of the adjacent manifolds 12a, 12b. The grooves 35a, 35b have the depth which is substantially equivalent to or slightly greater than the diameter of the connecting pin 14. Therefore, when the connecting pin 14 is inserted-into the engaging holes 34a, 34b, then the connecting section 65 of the connecting pin 14 is appropriately accommodated in the grooves 35a, 35b, and the connecting section 65 does not protrude from the upper surface of the body 12 (see FIG. 8). As a result, the manifold 12a is engaged with the body 18 of the adjacent manifold 12b by the connecting pin 14.

As shown in FIG. 9, the engaging holes 34a, 34b penetrate into the connecting port 22 to which the joint member 24 is installed. Therefore, when the shaft sections 66a, 66b of the connecting pin 14 are inserted into the engaging holes 34a, 34b respectively after inserting the joint member 24 into the connecting port 22, the shaft sections 66a, 66b are engaged with the annular recess 60 of the joint member 24.

The annular recess 60 is formed so that the position in the axial direction is coincident with the engaging holes 34a, 34b when the joint member 24 is inserted into the connecting port 22.

As a result, wall surfaces 67a, 67b provided on both sides of the annular recess 60 are engaged with the shaft sections 66a, 66b of the connecting pins 14 in the axial direction of the body 18. Therefore, the joint member 24 is connected to the connecting port 22 of the body 12, and the joint member 24 is prevented from disengagement in the axial direction of the body 18.

Further, the joint member 24 can be easily connected only by inserting the shaft sections 66a, 66b of the connecting pin 14 into the engaging holes 34a, 34b.

As shown in FIGS. 1 and 2, bent sections 69a, 69b, which are bent while being inclined by predetermined angles such that the bent section 69a is close to the bent section 69b, are formed at the both ends of the connecting plate 16. The bent sections 69a, 69b are formed so that the distance therebetween is gradually shortened toward free ends of the bent sections 69a, 69b. The connecting plate 16 is formed of a material (for example, a thin plate-shaped resin material) capable of elastic deformation.

As shown in FIG. 2, engaging grooves 71a, 71b are formed on the engaging projections 36a, 36b disposed on the side of the second end of the body 12, respectively, and are matched to the shapes of the inner wall surfaces of the bent sections 69a, 69b. When the connecting plate 16 is installed upwardly from a lower position, the bent section 69a is engaged with the engaging groove 71a, and the bent section 69b is engaged with the engaging groove 71b. Accordingly, the engaging projections 36a, 36b are interposed thereby, and the second ends of the manifold 12a and the manifold 12b are retained by the connecting plate 16.

The first ends of the bodies 18, at which the connecting ports 22 are formed, are connected by the connecting pin 14, and the second ends are connected by the connecting plate 16. Accordingly, it is possible to tightly connect the manifold 12a and the adjacent manifold 12b.

In the manifold-connecting mechanism 10 according to the embodiment of the present invention, the two manifolds 12a, 12b are connected. However, when connecting pins 14 and connecting plates 16 are prepared corresponding to a number of manifolds to be connected, it is possible to appropriately connect a plurality of manifolds without being limited to the number of manifolds.

The manifold-connecting mechanism 10 according to the embodiment of the present invention is basically constructed as described above. Next, its operation, function, and effect will be explained. Connecting members 72a, 72b are connected to the manifolds 12a, 12b shown in FIGS. 4 to 6. The connecting members 72a, 72b are provided with first plugs 68 and second plugs 70 for supplying/discharging the pressure fluid to/from the inside of the manifolds 12a, 12b.

The connecting members 72a, 72b differ only in the first projection 38 and the second projection 40, the first connecting section 42 and the second connecting section 44, and the first positioning hole 46 and the second positioning hole 48 which are formed on the side surfaces respectively. The connecting members 72a, 72b are constructed by the same constituent elements except for the above. Therefore, the first connecting member 72a will be explained below, and the second connecting member 72b will be explained about only its different points. The constituent elements that are same as those of the manifolds 12a, 12b are designated by the same reference numeral, and any explanation thereof will be omitted.

To the first side surface of the connecting member 72a, the first plug 68 and the second plug 70 are connected. The pressure fluid is supplied via the unillustrated tube to the first plug 68. The second plug 70 is spaced by a predetermined distance from the first plug 68 and releases the pressure fluid in the solenoid-operated valve 17 (see FIG. 6) to the atmospheric air. The first plug 68 and the second plug 70 communicate with the unillustrated passages in the first connecting section 42 and the second connecting section 44 formed on the opposite side of the first plug 68 and the second plug 70.

The first plug 68 communicates with the first ports 28 disposed in the manifolds 12a, 12b via the unillustrated passage formed in the first connecting section 42 when the connecting member 72a is adjoined to the manifold 12a.

Similarly, the second plug 70 communicates with the third ports 32 disposed in the manifolds 12a, 12b via the unillustrated passage formed in the second connecting section 44 when the connecting member 72a is adjoined to the manifold 12a.

Further, the first projection 38 and the second projection 40 are formed on the side opposite to the side to which the first plug 68 and the second plug 70 are connected, in the same manner as the manifolds 12a, 12b. The first projection 38 and the second projection 40 are inserted into the first positioning hole 46 and the second positioning hole 48 of the manifold 12a, 12b, respectively.

Further, the engaging hole 34b, 34a are formed on the upper surface of the connecting member 72a, 72b on the side to which the manifolds 12a, 12b are connected, in the same manner as the manifolds 12a, 12b. The grooves 35b, 35a are recessed by a predetermined depth.

The connecting member 72b differs in that the first positioning hole 46, the second positioning hole 48, the first opening 52, and the second opening 54 are formed in place of the first projection 38, the second projection 40, the first connecting section 42, and the second connecting section 44 which are formed on the side surface of the connecting member 72a.

Figure 4:
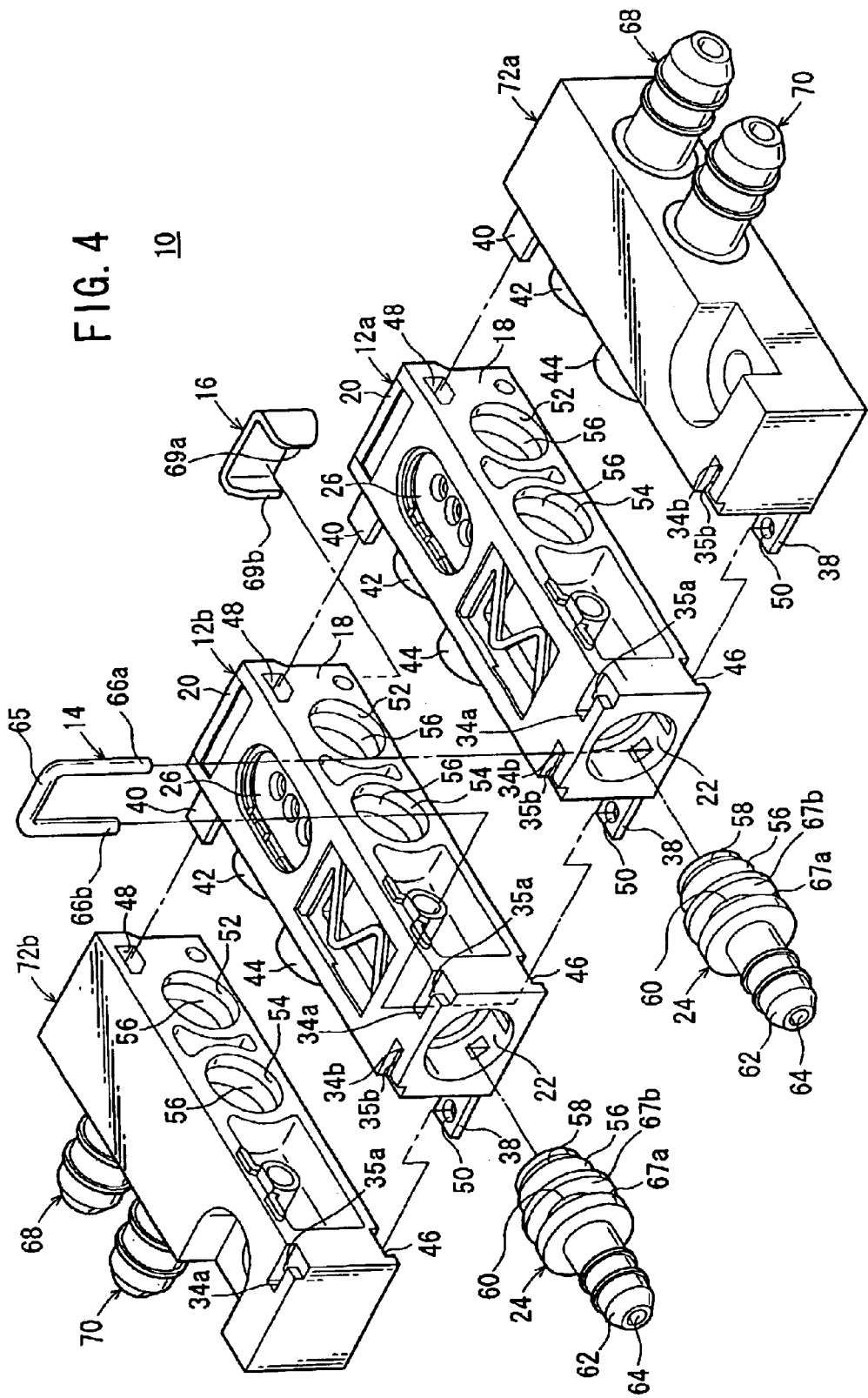
FIG. 4 is a perspective view illustrating the assembling process of each element, before manifolds and connecting members are connected.
Figure 5:
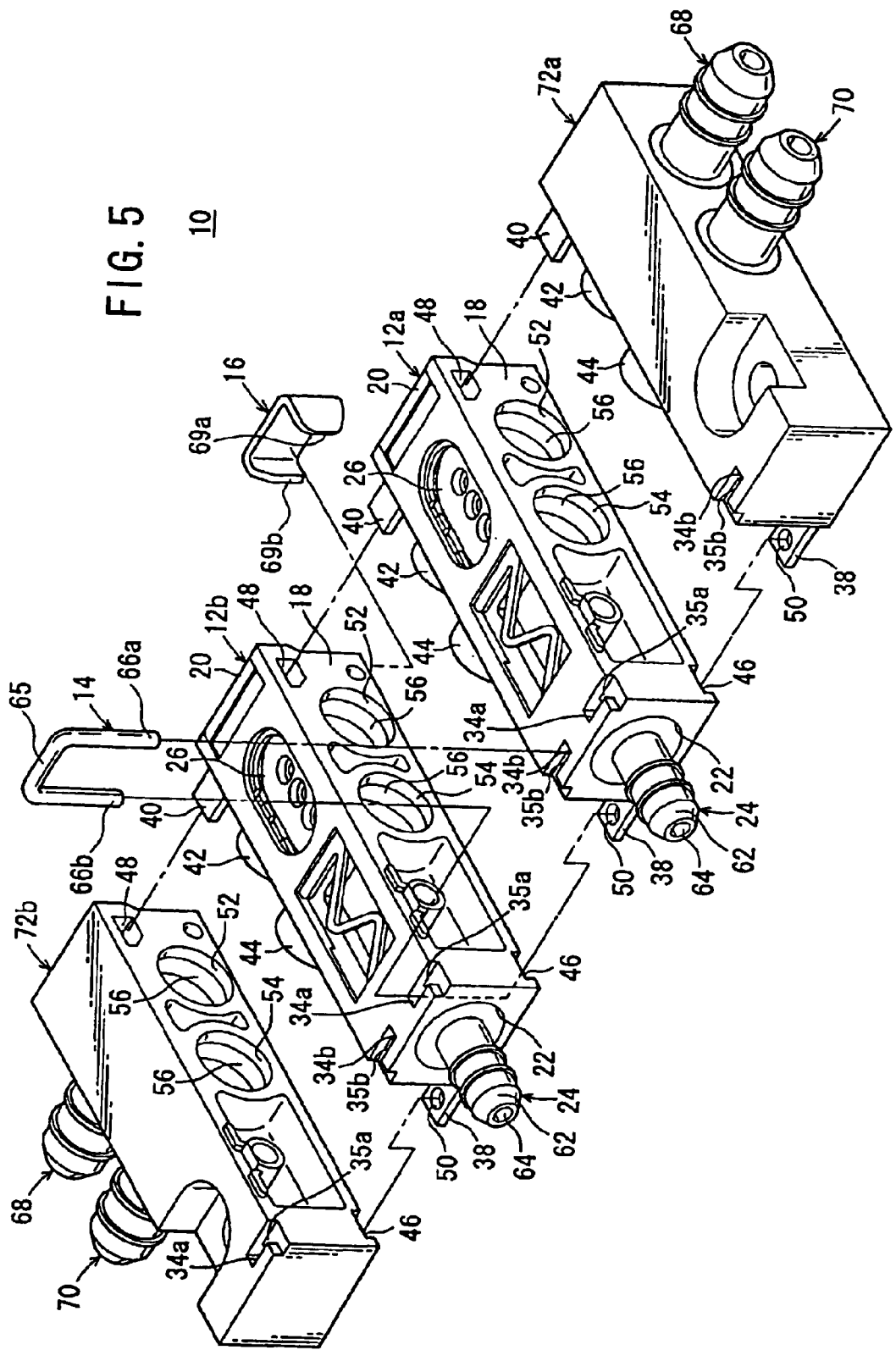
FIG. 5 is a perspective view illustrating the assembling process of each element where joint members are connected to the manifolds shown in FIG. 4.

Firstly, an explanation will be made about a method of connecting the manifold-connecting mechanism 10 as shown in FIGS. 4 to 6.

As shown in FIG. 4, the manifolds 12a, 12b and the connecting members 72a, 72b are arranged so that they are disposed substantially in parallel. In this situation, the connecting pins 14 and the connecting plates 16 are not installed to the engaging holes 34a, 34b and the engaging projections 36a, 36b respectively.

Subsequently, as shown in FIG. 5, the joint members 24 are inserted into the connecting ports 22 of the manifolds 12a, 12b. The side surfaces of the manifolds 12a, 12b abut against the side surfaces of the connecting members 72a, 72b (see FIG. 6). In this situation, the first projections 38 and the second projections 40, which protrude from the side surfaces of the manifolds 12a, 12b and the connecting members 72a, 72b, are inserted into the first positioning holes 46 and the second positioning holes 48 of the adjacent manifolds 12a, 12b. Accordingly, the manifolds 12a, 12b can be positioned in parallel with ease.

The first connecting sections 42 and the second connecting sections 44 are inserted into the first openings 52 and the second openings 54. The adjacent manifolds 12a, 12b communicate with the connecting members 72a, 72b through the first openings 52 and the second openings 54 via the passages disposed in the first connecting sections 42 and the second connecting sections 44.

That is, the first plug 68 of the connecting member 72a communicates with the first ports 28 via the unillustrated passages disposed in the manifolds 12a, 12b, and communicates with the first plug 68 of the connecting member 72b.

Further, the second plug 70 of the connecting member 72a communicates with the third ports 32 via the unillustrated passages disposed in the manifolds 12a, 12b, and communicates with the second plug 70 of the connecting member 72b.

Finally, as shown in FIG. 6, the shaft sections 66a, 66b of the connecting pin 14 are inserted into the engaging hole 34b of the connecting member 72a and the engaging hole 34a of the manifold 12a, respectively, while the manifolds 12a, 12b and the connecting members 72a, 72b are arranged adjacently in parallel.

Substantially simultaneously, the shaft sections 66a, 66b of the connecting pins 14 are inserted between the engaging hole 34b of the manifold 12a and the engaging hole 34a of the manifold 12b, and between the engaging hole 34b of the manifold 12b and the engaging hole 34a of the connecting member 72b, respectively.

As a result, the manifolds 12a, 12b and the connecting members 72a, 72b are connected by the connecting pins 14 inserted into the engaging holes 34a, 34b.

The shaft section 66a of the connecting pin 14 inserted into the engaging hole 34a is also inserted into the through-hole 50 of the first projection 38 in the first positioning hole 46. As a result, the first projection 38 is fastened by the connecting pin 14, and the first projection 38 is prevented from disengagement from the first positioning hole 46.

Further, as shown in FIGS. 8 and 9, the shaft sections 66a, 66b of the connecting pins 14 inserted into the engaging holes 34a, 34b are also inserted into the annular recesses 60 of the joint members 24 in the connecting ports 22 respectively while the joint members 24 are installed to the connecting ports 22. Further, the shaft sections 66a, 66b are held between the wall surfaces 67a, 67b of the annular recesses 60 respectively. Therefore, the joint members 24 are connected to the connecting ports 22. As a result, it is possible to prevent the joint members 24 from being disengaged from the connecting ports 22.

Figure 7:
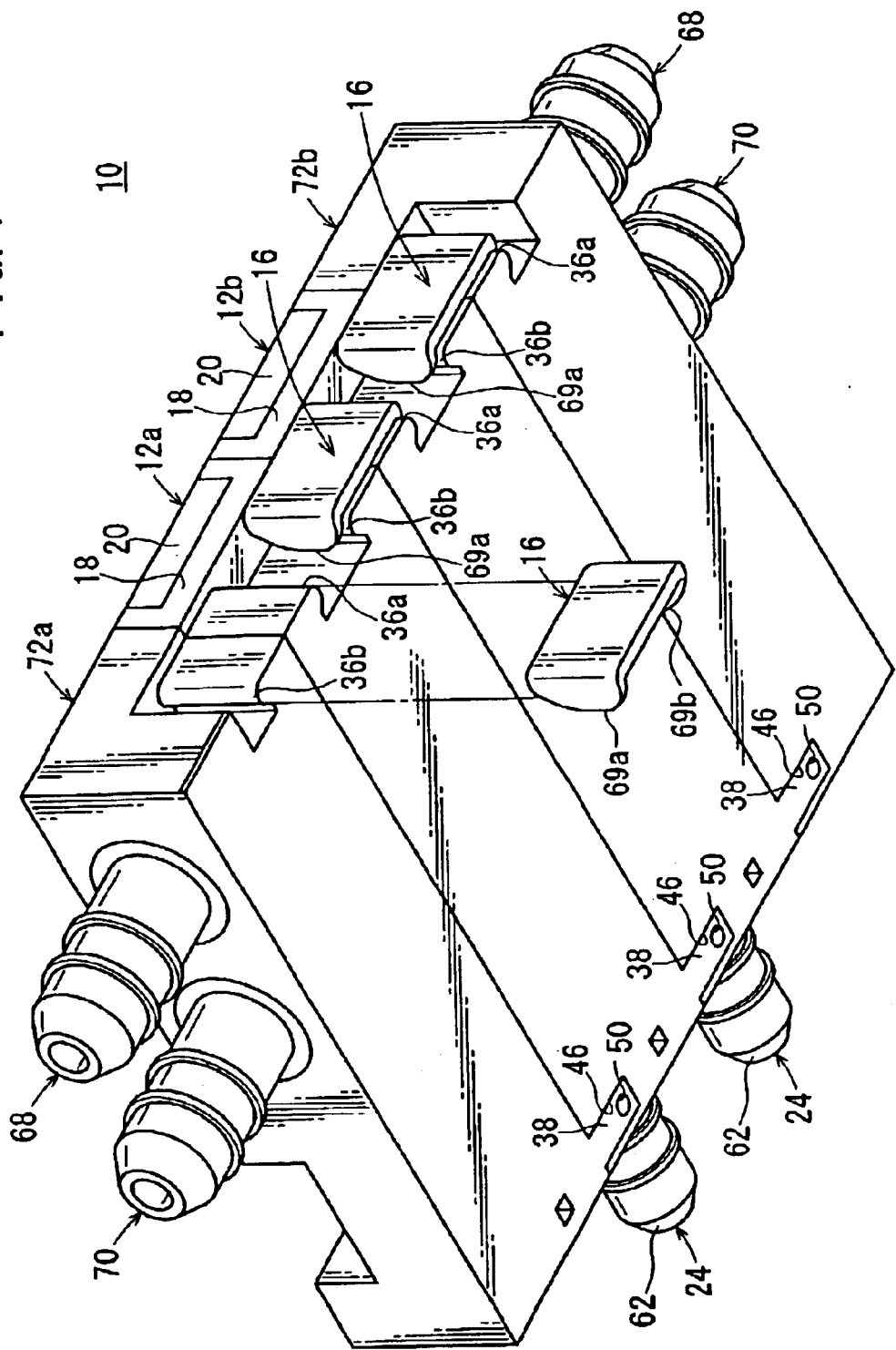
FIG. 7 is a perspective view illustrating the assembling process of each element as viewed in the direction of the arrow Z when the manifolds shown in FIG. 6 are connected.

Further, as shown in FIG. 7, the connecting plate 16 is slid upwardly from a lower position along the portion at which the engaging projection 36b disposed at the second end of the manifold 12a and the engaging projection 36a of the adjacent manifold 12b are matched.

The portion, at which the engaging projection 36b of the manifold 12a and the engaging projection 36a of the adjacent manifold 12b are matched, is slightly larger than the inner shapes of the bent sections 69a, 69b of the connecting plate 16. Therefore, the bent sections 69a, 69b are fittingly pressed outwardly by the outer wall surfaces of the engaging projections 36a, 36b. As a result, the second ends of the bodies 18 of the manifolds 12a, 12b are connected. Further, the connecting plates 16 inserted from the lower positions into the engaging projections 36a, 36b are prevented from downward disengagement.

Therefore, the first ends of the manifolds 12a, 12b and the connecting members 72a, 72b are connected by the connecting pins 14 inserted into the engaging holes 34a, 34b.

The second ends of the manifolds 12a, 12b and the connecting members 72a, 27b are connected by the connecting plates 16 engaged with the engaging projections 36a, 36b.

As described above, in the embodiment of the present invention, when the respective manifolds 12a, 12b are connected in parallel, the connecting operation is easy since the connecting pins 14 is inserted into the engaging holes 34a, 34b and the connecting plates 16 is engaged with the engaging projections 36a, 36b. Therefore, it is possible to improve the assembling operability when the manifolds 12a, 12b are connected.

It is unnecessary to use the rail member which has been hitherto used when the manifolds are connected. Therefore, it is possible to save the space in which the rail member is placed, or it is possible to effectively use the space.

The joint member 24 can be easily fixed to the connecting port 22 by inserting the joint member 24 into the connecting port 22 of the body 18 and engaging with the shaft sections 66a, 66b of the connecting pins 14 inserted into the engaging holes 34a, 34b. Therefore, it is possible to improve the assembling operability of the joint member 24. Further, it is unnecessary to perform any screw machining applied to the port, which is performed when the joint member is screwed for attachment. Therefore, it is possible to reduce the cost.

Even when the number of the manifolds 12a, 12b is increased or decreased, it is possible to easily increase or decrease the number of the connecting pins 14 and the connecting plates 16 in conformity with the number of the manifolds 12a, 12b.

As shown in FIG. 6, in the manifold-connecting mechanism 10 connected as described above, the pressure fluid supplied from the first plug 68 of the connecting member 72a, 72b, flows into the first port 28 of each of the manifolds 12a, 12b via the first opening 52 of each of the manifolds 12a, 12b from the unillustrated passage of the first connecting section 42 of the connecting member 72a, 72b. The pressure fluid flows from the first port 28 of the manifold 12a, 12b into the port of the solenoid-operated valve 17 connected via the installation cavity 26, and further flows inside of the solenoid-operated valve 17.

The pressure fluid in the solenoid-operated valve 17 is discharged via the third port 30. The pressure fluid is discharged from the communication passage 64 of the joint member 24 via the unillustrated passage disposed in the body 18 of each of the manifolds 12a, 12b. During this process, the pressure fluid does not leak outside, because air-tightness is retained between the joint member 24 and the connecting port 22 by the seal member 56 installed to the annular groove 58. The joint member 24 is not disengaged from the connecting port 22, because the annular recess 60 is reliably engaged by the shaft sections 66a, 66b of the connecting pins 14.

When the inside of the solenoid-operated valve 17 is opened to the atmospheric air, the third port 32, which communicates with the interior of the solenoid-operated valve 17, communicates with the second plug 70 of the connecting member 72a, 72b via the second connecting section 44.

The connected manifolds 12a, 12b can easily be a unit by connecting the manifolds 12a, 12b and the connecting members 72a, 72b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A manifold-connecting mechanism for communicating between passages of first and second manifolds by connecting said first and second manifolds, said manifold-connecting mechanism comprising:

a connecting pin inserted into engaging holes formed on first ends of said first and second manifolds for connecting said manifolds;

a connecting plate installed to engaging projections formed on second ends of said first and second manifolds; and a joint member detachably installed to a fluid port disposed on each of said first ends of said manifolds;

wherein said joint member is provided with an annular recess for preventing said joint member from displacement in an axial direction by inserting said connecting pin into said engaging holes.

2. The manifold-connecting mechanism according to claim 1, wherein said connecting pin is U-shaped, and said connecting pin has a pair of shaft sections.

3. The manifold-connecting mechanism according to claim 1, wherein a pair of bent sections are formed on said connecting plate, said bent sections are bent to be close to each other.

4. The manifold-connecting mechanism according to claim 3, wherein said pair of bent sections of said connecting plate are installed to engaging grooves of said pair of engaging projections provided on said first and second manifolds.

5. The manifold-connecting mechanism according to claim 1, wherein a projection is formed on a side surface of said first manifold, and an insertion hole is formed at a position on said second manifold facing said projection.

6. The manifold-connecting mechanism according to claim 5, wherein a through-hole is formed through said projection so that said through-hole is coaxial with an axis of said engaging hole of said second manifold when said projection is inserted into said insertion hole.

7. The manifold-connecting mechanism according to claim 5, wherein said projection is provided with a through-hole into which a shaft section is inserted when said projection is inserted into said insertion hole and said connecting pin is inserted into said engaging holes.

8. The manifold-connecting mechanism according to claim 1, wherein grooves each of which is recessed by a predetermined depth and which are continued to said engaging holes, are formed in bodies of said first and second manifolds.

9. The manifold-connecting mechanism according to claim 8, wherein a connecting section of said connecting pin inserted into said engaging holes is accommodated in said grooves.

10. The manifold-connecting mechanism according to claim 1, wherein said joint member comprises a tube-inserting section which is formed on a first end of said joint member and inserted into a tube, and a communication passage through which a pressure fluid is supplied, and wherein a second end of said joint member is installed into said fluid port.

11. A manifold-connecting mechanism for communicating between passages of first and second manifolds by connecting said first and second manifolds, said manifold-connecting mechanism comprising:

a connecting pin inserted into engaging holes formed on first ends of said first and second manifolds for connecting said manifolds;

a connecting plate installed to engaging projections formed on second ends of said first and second manifolds; and a joint member detachably installed to a fluid port disposed on each of said first ends of said manifolds, wherein said connecting pin is U-shaped, and said connecting pin has a pair of shaft sections.

12. The manifold-connecting mechanism according to claim 11, wherein said joint member is provided with an annular recess for preventing said joint member from displacement in an axial direction by inserting said connecting pin into said engaging holes.

13. The manifold-connecting mechanism according to claim 11, wherein a pair of bent sections are formed on said connecting plate, said bent sections are bent to be close to each other.

14. The manifold-connecting mechanism according to claim 13, wherein said pair of bent sections of said connecting plate are installed to engaging grooves of said pair of engaging projections provided on said first and second manifolds.

15. The manifold-connecting mechanism according to claim 11, wherein a projection is formed on a side surface of said first manifold, and an insertion hole is formed at a position on said second manifold facing said projection.

16. The manifold-connecting mechanism according to claim 15, wherein a through-hole is formed through said projection so that said through-hole is coaxial with an axis of said engaging hole of said second manifold when said projection is inserted into said insertion hole.

17. The manifold-connecting mechanism according to claim 15, wherein said projection is provided with a through-hole into which a shaft section is inserted when said projection is inserted into said insertion hole and said connecting pin is inserted into said engaging holes.

18. The manifold-connecting mechanism according to claim 11, wherein grooves each of which is recessed by a predetermined depth and which are continued to said engaging holes, are formed in bodies of said first and second manifolds.

19. The manifold-connecting mechanism according to claim 18, wherein a connecting section of said connecting pin inserted into said engaging holes is accommodated in said grooves.

20. The manifold-connecting mechanism according to claim 12, wherein said joint member comprises a tube-inserting section which is formed on a first end of said joint member and inserted into a tube, and a communication passage through which a pressure fluid is supplied, and wherein a second end of said joint member is installed into said fluid port.

21. A manifold-connecting mechanism for communicating between passages of first and second manifolds by connecting said first and second manifolds, said manifold-connecting mechanism comprising:

a connecting pin inserted into engaging holes formed on first ends of said first and second manifolds for connecting said manifolds;

a connecting plate installed to engaging projections formed on second ends of said first and second manifolds; and a joint member detachably installed to a fluid port disposed on each of said first ends of said manifolds, wherein a projection is formed on a side surface of said first manifold, and an insertion hole is formed at a position on said second manifold facing said projection, and wherein a through-hole is formed through said projection so that said through-hole is coaxial with an axis of said engaging hole of said second manifold when said projection is inserted into said insertion hole.

22. The manifold-connecting mechanism according to claim 21, wherein said joint member is provided with an annular recess for preventing said joint member from displacement in an axial direction by inserting said connecting pin into said engaging holes.

23. The manifold-connecting mechanism according to claim 21, wherein said connecting pin is U-shaped, and said connecting pin has a pair of shaft sections.

24. The manifold-connecting mechanism according to claim 21, wherein a pair of bent sections are formed on said connecting plate, said bent sections are bent to be close to each other.

25. The manifold-connecting mechanism according to claim 24, wherein said pair of bent sections of said connecting plate are installed to engaging grooves of said pair of engaging projections provided on said first and second manifolds.

26. The manifold-connecting mechanism according to claim 21, wherein said projection is provided with said through-hole into which a shaft section is inserted when said projection is inserted into said insertion hole and said connecting pin is inserted into said engaging holes.

27. The manifold-connecting mechanism according to claim 21, wherein grooves each of which is recessed by a predetermined depth and which are continued to said engaging holes, are formed in bodies of said first and second manifolds.

28. The manifold-connecting mechanism according to claim 27, wherein a connecting section of said connecting pin inserted into said engaging holes is accommodated in said grooves.

29. The manifold-connecting mechanism according to claim 22, wherein said joint member comprises a tube-inserting section which is formed on a first end of said joint member and inserted into a tube, and a communication passage through which a pressure fluid is supplied, and wherein a second end of said joint member is installed into said fluid port.

30. A manifold-connecting mechanism for communicating between passages of first and second manifolds by connecting said first and second manifolds, said manifold-connecting mechanism comprising:

a connecting pin inserted into engaging holes formed on first ends of said first and second manifolds for connecting said manifolds;

a connecting plate installed to engaging projections formed on second ends of said first and second manifolds; and a joint member detachably installed to a fluid port disposed on each of said first ends of said manifolds, wherein grooves each of which is recessed by a predetermined depth and which are continued to said engaging holes, are formed in bodies of said first and second manifolds.

31. The manifold-connecting mechanism according to claim 30, wherein said joint member is provided with an annular recess for preventing said joint member from displacement in an axial direction by inserting said connecting pin into said engaging hole.

32. The manifold-connecting mechanism according to claim 30, wherein said connecting pin is U-shaped, and said connecting pin has a pair of shaft sections.

33. The manifold-connecting mechanism according to claim 30, wherein a pair of bent sections are formed on said connecting plate, said bent sections are bent to be close to each other.

34. The manifold-connecting mechanism according to claim 33, wherein said pair of bent sections of said connecting plate are installed to engaging grooves of said pair of engaging projections provided on said first and second manifolds.

35. The manifold-connecting mechanism according to claim 30, wherein a projection is formed on a side surface of said first manifold, and an insertion hole is formed at a position on said second manifold facing said projection.

36. The manifold-connecting mechanism according to claim 35, wherein a through-hole is formed through said projection so that said through-hole is coaxial with an axis of said engaging hole of said second manifold when said projection is inserted into said insertion hole.

37. The manifold-connecting mechanism according to claim 35, wherein said projection is provided with a through-hole into which a shaft section is inserted when said projection is inserted into said insertion hole and said connecting pin is inserted into said engaging holes.

38. The manifold-connecting mechanism according to claim 30, wherein a connecting section of said connecting pin inserted into said engaging holes is accommodated in said grooves.

39. The manifold-connecting mechanism according to claim 31, wherein said joint member comprises a tube-inserting section which is formed on a first end of said joint member and inserted into a tube, and a communication passage through which a pressure fluid is supplied, and wherein a second end of said joint member is installed into said fluid port.

* * * * *